(12) United States Patent
Liu et al.

(10) Patent No.: US 7,790,803 B2
(45) Date of Patent: Sep. 7, 2010

(54) CROSSLINKED ORGANIC-INORGANIC HYBRID MEMBRANES AND THEIR USE IN GAS SEPARATION

(75) Inventors: Chunqing Liu, Schaumburg, IL (US); Stephen T. Wilson, Libertyville, IL (US); Santi Kulprathipanja, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 117 days.

(21) Appl. No.: 12/131,392

(22) Filed: Jun. 2, 2008

(65) Prior Publication Data

US 2009/0299015 A1 Dec. 3, 2009

(51) Int. Cl.
C07B 37/00 (2006.01)

(52) U.S. Cl. .................................................. 525/54.3

(58) Field of Classification Search ................ 525/54.3
See application file for complete search history.

(56) References Cited

U.S. PATENT DOCUMENTS

| | | | | |
|---|---|---|---|---|
| 3,567,632 A | 3/1971 | Richter et al. | ................. | 210/23 |
| 4,230,463 A | 10/1980 | Henis et al. | .................... | 55/16 |
| 4,551,156 A * | 11/1985 | Li | ................... | 95/47 |
| 4,728,345 A | 3/1988 | Murphy | ........................ | 55/158 |
| 4,740,219 A | 4/1988 | Kulprathipanja et al. | ........ | 55/16 |
| 4,925,459 A | 5/1990 | Rojey et al. | .................... | 155/49 |
| 4,968,430 A | 11/1990 | Hildenbrand et al. | ........ | 210/640 |
| 5,104,532 A | 4/1992 | Thompson et al. | ........... | 210/224 |
| 5,127,925 A | 7/1992 | Kulprathipanja et al. | ........ | 55/16 |
| 5,288,304 A | 2/1994 | Koros et al. | ..................... | 95/45 |
| 5,431,864 A | 7/1995 | Rao et al. | ................... | 264/29.5 |
| 5,447,559 A | 9/1995 | Rao et al. | ......................... | 96/4 |
| 5,507,856 A | 4/1996 | Rao et al. | ........................ | 95/50 |
| 5,538,536 A | 7/1996 | Fuentes et al. | ..................... | 95/45 |
| 6,248,682 B1 | 6/2001 | Thompson et al. | .............. | 502/4 |
| 6,500,233 B1 | 12/2002 | Miller et al. | .................... | 95/50 |
| 6,503,295 B1 | 1/2003 | Koros et al. | ..................... | 95/51 |
| 6,508,860 B1 | 1/2003 | Kulkarni et al. | ................. | 95/51 |
| 6,562,110 B2 | 5/2003 | Koros et al. | ....................... | 96/4 |
| 6,585,802 B2 | 7/2003 | Koros et al. | ..................... | 95/51 |
| 6,605,140 B2 | 8/2003 | Guiver et al. | ..................... | 96/4 |
| 6,626,980 B2 | 9/2003 | Hasse et al. | ..................... | 95/51 |
| 6,726,744 B2 | 4/2004 | Kulprathipanja et al. | ........ | 95/45 |
| 6,740,143 B2 | 5/2004 | Corbin et al. | ................... | 96/11 |
| 6,755,900 B2 | 6/2004 | Koros et al. | ..................... | 96/10 |
| 6,863,983 B2 | 3/2005 | Tsapatsis et al. | ............ | 428/446 |
| 6,932,859 B2 | 8/2005 | Koros et al. | ..................... | 96/10 |
| 6,946,015 B2 | 9/2005 | Jorgensen et al. | .............. | 95/51 |
| 6,997,971 B1 | 2/2006 | Young et al. | .................... | 95/45 |
| 7,025,804 B2 | 4/2006 | Simmons et al. | ................ | 95/51 |
| 7,109,140 B2 | 9/2006 | Marand et al. | .................. | 502/4 |
| 7,138,006 B2 | 11/2006 | Miller et al. | .................... | 95/45 |
| 7,166,146 B2 | 1/2007 | Miller et al. | .................... | 95/45 |
| 2002/0053284 A1 | 5/2002 | Koros et al. | ..................... | 95/51 |
| 2003/0220188 A1 | 11/2003 | Marand et al. | ................ | 502/60 |
| 2003/0221559 A1 | 12/2003 | Koros et al. | ..................... | 96/10 |
| 2004/0261616 A1 | 12/2004 | Jorgensen et al. | .............. | 95/51 |
| 2005/0043167 A1 | 2/2005 | Miller et al. | .................... | 502/4 |
| 2005/0230305 A1 | 10/2005 | Kulkarni et al. | ........ | 210/500.23 |
| 2005/0268782 A1 | 12/2005 | Kulkarni et al. | ................... | 96/4 |
| 2006/0107830 A1 | 5/2006 | Miller et al. | .................... | 95/45 |
| 2006/0117949 A1 | 6/2006 | Kulkarni et al. | ................ | 95/45 |
| 2007/0022877 A1 | 2/2007 | Marand et al. | .................. | 95/51 |

FOREIGN PATENT DOCUMENTS

EP 1 188 477 A1 3/2002
WO WO 2007/007051 A1 1/2007

OTHER PUBLICATIONS

Baker, Ind. Eng. Chem Res., 41: 1393 (2002).
Tsai et al., J. Membr. Sci., 169: 255 (2000).
Baltus et al., Sep. Sci. Tech., 40: 525 (2005).
Kovvali et al., Ind. Eng. Chem. Res., 40: 2502 (2001).
Kovvali et al., Ind. Eng. Chem. Res. 41: 2287 (2002).
Lin et al., J. Mol. Str., 739: 57 (2005).
Lin et al., Macromolecules 38: 8394 (2005).
Lin et al., Macromolecules 38: 8381 (2005).
Patel et al., Adv. Func. Mater., 14 (7): 699 (2004).
Patel et al., Macromol. Chem. Phy., 205: 2409 (2004).
Li et al., J. Appl. Polym. Sci., 58: 1455 (1995).

* cited by examiner

*Primary Examiner*—Ling-Siu Choi
*Assistant Examiner*—Sonya Wright
(74) *Attorney, Agent, or Firm*—Mark Goldberg

(57) ABSTRACT

The present invention is for crosslinked membranes and in particular for crosslinked poly(ethylene oxide)-cellulose acetate-silsesquioxane (PEO-CA-Si) organic-inorganic hybrid membranes and their use in gas separation. These crosslinked PEO-CA-Si membranes were prepared by in-situ sol-gel co-condensation of crosslinkable PEO-organotrialkoxysilane and CA-organotrialkoxysilane polymers in the presence of acetic acid catalyst during the formation of membranes. The crosslinkable PEO- and CA-organotrialkoxysilane polymers were synthesized via the reaction between the hydroxyl groups on PEO (or on CA) and the isocyanate on organotrialkoxysilane to form urethane linkages under mild conditions. The crosslinked PEO-CA-Si membranes exhibited both increased selectivity of $CO_2/N_2$ and $CO_2$ permeability as compared to a CA membrane, suggesting that these membranes are very promising for gas separations such as $CO_2/N_2$ separation.

5 Claims, No Drawings

CROSSLINKED ORGANIC-INORGANIC HYBRID MEMBRANES AND THEIR USE IN GAS SEPARATION

BACKGROUND OF THE INVENTION

This invention pertains to crosslinked organic-inorganic hybrid membranes. More specifically, this invention pertains to crosslinked poly(ethylene oxide)-cellulose acetate-silsesquioxane (PEO-CA-Si) organic-inorganic hybrid membranes and methods of making these membranes. This invention also pertains to the application of these membranes for gas separations such as $CO_2/N_2$ separation.

$CO_2$ is an impurity that must be removed from mixtures with light gases such as $CH_4$, $N_2$ and $H_2$, and the scale of these separations is enormous. See Kohl, et al., GAS PURIFICATION, Fifth Ed., Gulf Publishing, Houston, Tex., 1997. Membrane-based separation of $CO_2$ from gas streams is an important unit operation. Separations of $CO_2$ with membranes include natural gas purification, $CO_2$ capture from flue gas (primarily in mixtures with $N_2$), and metabolic $CO_2$ removal from space life-supporting systems (extravehicular mobility unit (EMU), space shuttle or space station), and $CO_2$ removal from $H_2$.

General public awareness concerning the atmospheric greenhouse or "greenhouse warming" effect attributed to $CO_2$ has created the need to devise environmentally friendly and energy efficient technologies for the removal of $CO_2$ from industrial waste gas streams. Flue gas from fossil fuel power generation (primarily in mixtures with $N_2$) is the largest single contributor to $CO_2$ emissions. Therefore, $CO_2$ recovery from flue gas is becoming more important due to global warming. Generally, flue gas has a large volume and a relatively low concentration in $CO_2$ (typically 10-20 mol-%). Membrane-based separation of $CO_2$ from flue gas holds great promise due to its low energy consumption, low cost, easy operation, and low maintenance. A membrane system with a high processing capacity and a reasonably high selectivity for $CO_2/N_2$ is required in order to compete with other separation techniques such as physical or chemical absorption, low temperature distillation and pressure swing adsorption.

Separation of $CO_2$ from flue gas (mainly $N_2$) with commonly used polymeric membranes (e.g. cellulose acetate and fluorine-containing polyimides) or inorganic membranes (e.g. zeolite, sol-gel silica or carbon molecular sieve) is achieved by differences in diffusion rates and/or adsorption strengths of mixture components in the polymer matrix or the inorganic membrane pores, and selectivity is usually rather low, e.g. approximately 20 for $CO_2/N_2$ at about 50° C. for gas mixtures. See Baker, IND. ENG. CHEM. RES., 41: 1393 (2002); Tsai, et al., J. MEMBR. SCI, 169: 255 (2000). On the other hand, facilitated transports of $CO_2$ in ion-exchange or immobilized liquid membranes have been intensively investigated because they have high selectivity due to the chemical interaction between $CO_2$ and carrier molecules. See Baltus, et al., SEP. SCI. TECH., 40: 525 (2005). For example, a number of recently developed immobilized liquid membranes exhibited high (>1000) $CO_2/N_2$ selectivity due to facilitated $CO_2$ transport mechanism. However, there are still no practical applications for this type of membranes mainly because their $CO_2$ permeation rate is rather low especially at moderate levels of relative humidity (<40%), and also the durability and retention of the liquid in real process conditions are poor. See Kovvali, et al., IND. ENG. CHEM. RES., 40: 2502 (2001); Kovvali, et al., IND. ENG. CHEM. RES., 41: 2287 (2002).

Polymer blends have been the focus of extensive gas membrane separation research since 1980's. For example, poly (ethylene glycol) (PEG) and cellulose acetate or cellulose nitrate blend membranes have been investigated for $CO_2/N_2$ separation. It has been reported that PEG can dissolve substantial amounts of sour gases such as $CO_2$, and the diffusivity of large penetrants such as $CO_2$ and $CH_4$ in PEG may be high, considering its flexible main chain. A miscible blend membrane containing 10 wt-% of PEG with molecular weight of 20,000 showed both higher $CO_2/N_2$ selectivity and $CO_2$ permeability than those of the cellulose acetate membrane. See Li, et al., J. APPL. POLYM. SCI, 58: 1455 (1995). These blend polymers containing PEG, however, still have issues of durability and retention of the liquid PEG for real industrial applications.

To solve the longer term stability problem of PEG (or poly(ethylene oxide), PEO)-based polymer membranes, various techniques have been reported to crosslink PEG or PEO. For instance, radiation or radical crosslinking of PEG or PEO has been reported. Crosslinking by reactions of end groups such as hydroxyl or vinyl groups has been studied. See Lin et al., J. MOL. STR., 739: 57 (2005); Lin, et al., MACROMOLECULES, 38: 8394 (2005); Lin, et al., MACROMOLECULES, 38: 8381 (2005). All of these crosslinked PEG- or PEO-based membranes are organic polymeric membranes without the presence of inorganic segments, therefore, issues related to chemical resistance, thermal stability, and pressure stability (e.g. plasticization or swelling of membrane) may still exist. In addition, this type of crosslinked organic polymeric membranes has never been fabricated into asymmetric hollow fiber or flat sheet membranes possibly because they cannot be easily integrated into current polymer membrane manufacturing process using phase-inversion technique.

SUMMARY OF THE INVENTION

In order to overcome the inherent disadvantages of the existing membranes and to enhance gas separation performance, this invention provides for crosslinked organic-inorganic hybrid membranes with interchain-connected cellulose acetate and poly(ethylene oxide) organic polymers through covalently bound inorganic silsesquioxane ligands.

In general, the invention provides for crosslinked organic-inorganic hybrid membranes. More specifically, the present invention involves the preparation of crosslinked poly(ethylene oxide)-cellulose acetate-silsesquioxane (PEO-CA-Si) organic-inorganic hybrid membranes containing covalent bonds between the cellulose acetate (CA) and the poly(ethylene oxide) (PEO) polymer chains and their application for gas separations such as separation of carbon dioxide and nitrogen. These crosslinked PEO-CA-Si membranes with covalently interpolymer-chain-connected hybrid networks were prepared by simple in-situ sol-gel co-condensation of crosslinkable PEO-organotrialkoxysilane and CA-organotrialkoxysilane polymers in the presence of acetic acid catalyst during the formation of membranes. The crosslinkable PEO- and CA-organotrialkoxysilane polymers are synthesized via the reaction between the hydroxyl groups on PEO (or on CA) and the isocyanate on organotrialkoxysilane to form a urethane linkage under mild conditions.

These crosslinked organic-inorganic hybrid polymer membranes provide favorable characteristics including the following: First, the hard cellulose acetate and inorganic silsesquioxane segments provide good mechanical strength, the inorganic silsesquioxane crosslinking segments also offer good chemical resistance, high thermal and pressure stabilities, and the soft PEO segments offer high permeability because of the high mobility for polyether chains. Second, the strong affinity of the PEO segments for $CO_2$ molecules is believed to result in the high $CO_2/N_2$ selectivity. Third, the degree of crosslinking for the crosslinked organic-inorganic hybrid membranes can be easily controlled by adjusting the ratio of precursor organic CA and PEO polymers and the organosilicon alkoxide crosslinking agent. Fourth, these crosslinked organic-inorganic hybrid polymer membranes are different from organic-inorganic hybrid mixed matrix membranes in that there is no inorganic particle size issue, and they have much better chemical and mechanical stabilities compared to organic-inorganic hybrid mixed matrix membranes due to the existence of covalent bonds between the organic and inorganic segments; Fifth, the crosslinked PEO-CA-Si membranes in this invention can be easily integrated into current CA polymer membrane manufacturing process due to their simplified synthetic procedure compared to the crosslinked PEO dense film prepared by free radical polymerization method in the literature.

The crosslinked PEO-CA-Si membranes exhibited both significantly enhanced permeability of $CO_2$ (increased up to 60%) and greatly improved selectivity of $CO_2/N_2$ (increased up to 30%) compared to a cellulose acetate membrane. This improved selectivity means that these membranes are very promising for gas separations such as $CO_2/N_2$, olefin/paraffin, aromatics/non-aromatics, polar molecules such as $H_2O$, $H_2S$, $SO_2$ and $NH_3$/mixtures with $CH_4$, $N_2$, $H_2$, air, and other light gases separations.

DETAILED DESCRIPTION OF THE INVENTION

In recent years, numerous efforts have been focused on design of polymers containing poly(ethylene glycol) (PEG) or poly(ethylene oxide) (PEO) segments for $CO_2/N_2$ and $CO_2/H_2$ separations mainly because of the unique properties of the polar ether oxygen in PEG or PEO for $CO_2$ separations. However, the low molecular weight PEOs are in liquid phase and the solid-state high molecular weight PEOs are subject to a strong tendency to crystallize, which are deleterious conditions for gas permeability.

Crosslinking is a useful technique to convert liquid-state low molecular weight PEO to solid-state PEO and to reduce crystallinity in high molecular weight PEO. Crosslinking is also a useful method to improve the gas separation performance of polymer membranes. Crosslinking of polymers can provide crosslinked polymers with higher $T_g$ than un-crosslinked polymers. Therefore, the crosslinked polymer membranes always have a high resistance to plasticization, and exhibit excellent thermal and chemical stability, enhanced selectivity of gas pairs, improved mechanical stability, or enhanced contaminant resistance than the uncrosslinked polymer membranes. The membrane crosslinking methods include thermal treatment, radiation, chemical crosslinking, UV-photochemical, blending with other polymers, etc. See Koros, et al., US 20030221559 (2003); Jorgensen, et al., US 2004261616 (2004); Patel, et al., ADV. FUNC. MATER., 14 (7): 699 (2004); Patel, et al., MACROMOL. CHEM. PHY., 205: 2409 (2004).

There has been only a little work that has focused on crosslinking of polymeric membranes using inorganic materials. This invention pertains to crosslinked organic-inorganic hybrid membranes. More specifically, this invention pertains to crosslinked poly(ethylene oxide)-cellulose acetate-silsesquioxane (PEO-CA-Si) organic-inorganic hybrid membranes and methods of making the same. This invention also pertains to the application of these crosslinked poly(ethylene oxide)-cellulose acetate-silsesquioxane (PEO-CA-Si) organic-inorganic hybrid membranes for gas separations such as the $CO_2/N_2$ separation.

The crosslinked PEO-CA-Si organic-inorganic hybrid membranes were prepared by in-situ sol-gel co-condensation of crosslinkable PEO-organotrialkoxysilane and CA-organotrialkoxysilane polymers in the presence of acetic acid catalyst during the formation of the membranes. The crosslinked PEO-CA-Si organic-inorganic hybrid membranes can also be prepared from crosslinkable poly(propylene oxide-ethylene oxide-propylene oxide) (PPO-PEO-PPO tri-block co-polymer containing PEO segment)-organotrialkoxysilane and CA-organotrialkoxysilane polymers in the presence of acetic acid catalyst during the formation of the membranes. The crosslinkable PEO- and CA-organotrialkoxysilane polymers were synthesized via the reaction between the hydroxyl groups on PEO (the molecular weight of PEO can be varied, e.g. PEO400 and PEO1500 with molecular weights ($M_n$) of 400 and 1500, respectively) or CA and the isocyanate on the organotrialkoxysilane to form urethane linkages under mild conditions. All kinds of PEO polymers with different molecular weights in liquid or solid state can be used for the preparation of this new type of crosslinked organic-inorganic hybrid membranes. In addition, PPO-PEO-PPO tri-block co-polymer with different molecular weights (e.g. PPO-PEO-PPO2000 with $M_n$=2000) can also be used for the preparation of this new type of crosslinked organic-inorganic hybrid membranes. The crosslinkable PPO-PEO-PPO-organotrialkoxysilane polymers can be prepared via the reaction between the amino groups on both ends of PPO-PEO-PPO tri-block co-polymer and the epoxy group on the organotrialkoxysilane to form imine linkage under mild reaction conditions. Subsequent in-situ hydrolysis and condensation of these crosslinkable precursor polymers during the membrane-forming process yielded crosslinked organic-inorganic hybrid polymer membranes with covalently interpolymer-chain-connected hybrid networks.

The crosslinkable precursor polymers are prepared by reaction of the precursor polymer such as polyethylene oxide with an organosilicon alkoxide in the presence of a solvent such as tetrahydrofuran. The crosslinked organic-inorganic polymers are made by the sol-gel polymerization of two or more of these crosslinkable precursor polymers which may be solution cast as a dense film or otherwise used as a membrane.

Typical polymers as the precursor organic polymer suitable for the preparation of crosslinked organic-inorganic hybrid polymer membranes can be selected from any rubbery or glassy polymers containing organic functional groups on terminals or on the side chains of the polymer backbones (or called macromolecular backbones). The organic functional groups on the precursor organic polymer can be hydroxyl, amino, epoxy, isocyanato, dianhydride, etc. Example precursor organic polymers include poly(ethylene oxide)s (PEO), cellulose acetates (CA), poly(propylene oxide)s (PPO), co-block-poly(ethylene oxide)-poly(propylene oxide)s (PEO-PPO), tri-block-poly(propylene oxide)-poly(ethylene oxide)-poly(propylene oxide)s (PPO-PEO-PPO), poly(propylene glycol)-block-poly(ethylene glycol)-block-poly(propylene glycol) bis(2-aminopropyl ether) (PAPE), dendritic PEO, and hyperbranched amine-terminated PEO.

The organosilicon alkoxide crosslinking agents used to form covalent bonds with the precursor organic polymer should have two characteristics. One is that these organosilicon alkoxide crosslinking agents should contain at least one organic functional group that can react with the organic functional groups on the precursor organic polymer. The other is that these organosilicon alkoxide crosslinking agents should have at least two silicon alkoxide groups that can crosslinked with each other via a sol-gel condensation polymerization to form a fully crosslinked inter-polymer-chain network.

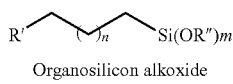
Organosilicon alkoxide

In the structure for the organosilicon alkoxide, n=-2-10; m=3; R' is an organic functional group which may include of —(CH$_2$)$_a$NH$_2$ (a=1-20), —(CH$_2$)$_a$OH (a=1-20), —(CH$_2$)$_a$NH(CH$_2$)$_2$NH$_2$ (a=1-20), OCH$_2$CH(OH)CH$_2$N(CH$_2$CH$_2$OH)$_2$, —(CH$_2$)$_a$N=C=O (a=1-20), —(CH$_2$)$_a$CH(O)CH$_2$ (a=1-20), and mixtures thereof; R" is a C1-C8 hydrocarbon group.

The crosslinking catalysts used to catalyze the sol-gel polymerization can be selected from either bases or acids. More preferably, the crosslinking catalysts are selected from weak acids such as acetic acid or hydrochloric acid.

The successful formation of urethane linkages between organic PEO and CA polymers and the inorganic silsesquioxane segments were confirmed by FTIR spectra. The crosslinked CA-silsesquioxane membrane showed the appearance of a vibration band at about 1568 cm$^{-1}$ corresponding to NH—CO group, indicating the formation of urethane linkages.

In this invention, crosslinked PEO-CA-Si organic-inorganic hybrid membranes were prepared that exhibited the advantages of the organic PEO polyether segments and CA polymer matrix, as well as the advanced features of inorganic silsesquioxane crosslinking segments. Ten to fifty percent by weight of the crosslinkable PEO-organotrialkoxysilane polymers were added to crosslinkable CA-organotrialkoxysilane polymers.

The permeability (P) and ideal selectivity ($\alpha_{CO2/N2}$) of the crosslinked PEO-CA-Si organic-inorganic hybrid membranes were measured by pure gas measurements at 50° C. under approximately 690 kPa (100 psig) pressure. As shown in Table 1, the crosslinked PEO-CA-Si organic-inorganic hybrid membranes offer both enhanced $P_{CO2}$ and $\alpha_{CO2/N2}$ compared to those of the pure CA polymer membrane, suggesting this new type of crosslinked PEO-CA-Si organic-inorganic hybrid membranes is very promising for gas separation applications of such as for $CO_2$ removal from flue gas (mainly $N_2$).

For example, as shown in Table 1, the $P_{CO2}$ of crosslinked 30% PPO-PEO-PPO2000-CA-Si with 30 wt-% of PPO-PEO-PPO2000-Si segments (12.2 Barrer) increased approximately 60% over that of pure CA dense film (7.56 Barrer), and in the meantime the ($\alpha_{CO2/N2}$ (29.8) increased approximately 25% compared to that of pure CA dense film ($\alpha_{CO2/N2}$=23.7). For another example, the $P_{CO2}$ of crosslinked 30% PEO400-CA-Si with 30 wt-% of PEO400-Si segments (10.6 Barrer) increased approximately 40% over that of pure CA dense film (7.56 Barrer), and in the meantime the $\alpha_{CO2/N2}$ (31.1) increased approximately 30% compared to that of pure CA dense film ($\alpha_{CO2/N2}$=23.7).

Pure gas permeation results for the crosslinked PEO-CA-Si organic-inorganic hybrid membranes in this invention (Table 1) were compared with those of the CA-PEG uncrosslinked blend membranes reported in the literature (Table 2, see Li, et al., J. APPL. POLYM. SCI., 58: 1455 (1995)). It can been seen from Table 2 that the uncrosslinked blend CA-PEG membranes containing 10 wt-% of PEG200, PEG600, and PEG2000 with PEG molecular weights of 200, 600, and 2000, respectively, showed very poor $CO_2/N_2$ selectivity of less than 15 without improvement for $CO_2$ permeability compared to pure CA membrane. While as shown in Table 1, the crosslinked PEO-CA-Si membranes prepared by chemical crosslinking approach described in this invention containing 30 wt-% of PEO400, PEG1500, or PPO-PEO-PPO2000 with molecular weights of 400, 1500, and 2000, respectively, exhibited both greatly improved $CO_2/N_2$ selectivities and $CO_2$ permeability compared to the pure CA membrane. These results demonstrated the effectiveness of the chemical crosslinking approach to improve the $CO_2/N_2$ gas separation performance of CA-PEO blend membranes.

The crosslinked organic-inorganic hybrid polymer membranes described in this invention can be used for a variety of liquid and gas separations such as $CO_2/N_2$, olefin/paraffin, aromatics/non-aromatics, polar molecules such as $H_2O$, $H_2S$, $SO_2$, and $NH_3$/mixtures with $CH_4$, $N_2$, $H_2$, air, and other light gas separations.

TABLE 1

Pure gas permeation test results of CA and crosslinked PEO-CA-Si membranes[a]

| Film | Pure CA | Crosslinked 30% PEO400-CA-Si | Crosslinked 30% PEO1500-CA-Si | Crosslinked 30% PPO-PEO-CA-PPO2000-Si |
|---|---|---|---|---|
| $P_{CO2\ (Barrer)}$ | 7.56 | 10.6 | 10.4 | 12.2 |
| $\Delta P_{CO2\ (Barrer)}$ | 0 | 40.2% | 37.6% | 61.4% |
| $P_{N2\ (Barrer)}$ | 0.319 | 0.341 | 0.362 | 0.410 |
| $\alpha_{CO2/N2}$ | 23.7 | 31.1 | 28.7 | 29.8 |
| $\Delta\alpha_{CO2/N2}$ | 0 | 31.2% | 21.1% | 25.7% |
| $P_{CH4\ (Barrer)}$ | 0.321 | 0.525 | 0.548 | 0.649 |
| $\alpha_{CO2/CH4}$ | 23.6 | 20.2 | 19.0 | 18.7 |

[a]Tested at 50° C. under 690 kPa (100 psig). 1 Barrer = $10^{-10}$ cm$^3$(STP) · cm/cm$^2$ · sec · cmHg.

TABLE 2

Pure gas permeation test results of CA and its blend membranes containing PEG[a]

| Film | CA | CA + 10% PEG200 | CA + 10% PEG600 | CA + 10% PEG2000 | CA + 10% PEG6000 | CA + 10% PEG20000 |
|---|---|---|---|---|---|---|
| $P_{CO2\ (Barrer)}$ | 5.96 | 4.92 | 5.72 | 6.30 | 6.16 | 7.49 |
| $P_{N2\ (Barrer)}$ | 0.231 | 0.918 | 0.418 | 0.452 | 0.194 | 0.207 |

TABLE 2-continued

Pure gas permeation test results of CA and its blend membranes containing PEG[a]

| Film | CA | CA + 10% PEG200 | CA + 10% PEG600 | CA + 10% PEG2000 | CA + 10% PEG6000 | CA + 10% PEG20000 |
|---|---|---|---|---|---|---|
| $P_{CH_4\,(Barrer)}$ | 0.205 | 1.14 | 0.831 | 0.549 | 0.247 | 0.248 |
| $P_{O_2\,(Barrer)}$ | 1.05 | 1.46 | 1.22 | 1.10 | — | 0.993 |
| $P_{H_2\,(Barrer)}$ | 14.9 | 22.2 | 14.8 | 13.8 | 10.9 | 11.4 |
| $D_{CO_2}$ ($\times 10^8$ cm$^2$/sec) | 0.560 | 0.475 | 0.639 | 0.723 | 0.929 | 1.00 |
| $S_{CO_2}$ ($\times 10^3$ cm$^3$ (STP)/cm$^3 \cdot$ cmHg) | 106 | 104 | 89.5 | 80.4 | 66.3 | 74.6 |
| $\alpha_{CO_2/N_2}$ | 25.8 | 5.36 | 13.7 | 13.9 | 31.7 | 36.2 |
| $\alpha_{CO_2/CH_4}$ | 29.2 | 4.31 | 6.88 | 11.5 | 25.0 | 30.3 |

[a]Tested at 35° C. under 27 kPa (3.9 psig); Table from literature Li, et al., J. APPL. POLYM. SCI., 58: 1455 (1995).
1 Barrer = $10^{-10}$ cm$^3$(STP) $\cdot$ cm/cm$^2 \cdot$ sec $\cdot$ cmHg.

EXAMPLE 1

Synthesis of Crosslinkable Cellulose Acetate (CA)-organotriethoxysilane Hybrid Polymer 5.0 g (18.9 mmol) of CA polymer was dissolved in 100.0 g of THF or 1,4-dioxane solvent. 1.29 g (5.2 mmol) of 3-isocyanatopropyltriethoxysilane was added to the CA solution. After the solution was heated at 60° C. for 24 hours, the crosslinkable CA-organotriethoxysilane hybrid polymer solution was obtained.

EXAMPLE 2

Synthesis of Crosslinkable PEO-organotriethoxysilane Hybrid Polymers

The crosslinkable PEO-organotriethoxysilane hybrid polymers were synthesized from the reaction between PEO400 ($M_n$=400) or PEO1500 ($M_n$=1500) polymer and 3-isocyanatopropyltriethoxysilane with PEO400 (or PEO1500) to 3-isocyanatopropyltriethoxysilane molar ratio of 1:2 using the same procedure as described in Example 1.

EXAMPLE 3

Synthesis of Crosslinkable PPO-PEO-PPO-organotriethoxysilane Hybrid Polymer

The crosslinkable PPO-PEO-PPO-organotriethoxysilane was synthesized from the reaction between poly(propylene glycol)-block-poly(ethylene glycol)-block-poly(propylene glycol) bis(2-aminopropyl ether) (PPO-PEO-PPO with $M_n$=2000) and (3-glycidoxypropyl)trimethoxysilane with PPO-PEO-PPO to (3-glycidoxypropyl)trimethoxysilane molar ratio of 1:2 according to the same procedure as that for the crosslinkable CA-organotriethoxysilane except that the reaction was conducted at room temperature.

EXAMPLE 4

Preparation of Crosslinked PEO-CA-Si Organic-Inorganic Hybrid Polymer Membranes A catalytic amount of acetic acid (0.01 g, 0.17 mmol) was added to 18.38 g of a polymer solution in 1,4-dioxane or THF containing 0.708 g (2.13 mmol) of crosslinkable CA-organotriethoxysilane prepared in Example 1 and 0.212 g of PEO400-organotriethoxysilane polymer (or PEO1500-organotriethoxysilane polymer) prepared in Example 2 followed by the addition of 0.01 g (0.22 mmol) of ethanol. The resulting solution was mixed for at least 6 hours at room temperature. The solution was then filtered through a 0.2 μm PTFE membrane filter. 16 g of the filtrate solution containing about 0.8 g of total polymers was cast onto the surface of a clean glass plate, and dried at room temperature for 24 hours. The resulting crosslinked PEO-CA-Si hybrid polymer membrane was detached from the glass plate and further dried at 110° C. for at least 48 hours in vacuo.

EXAMPLE 5

Preparation of Crosslinked PPO-PEO-PPO-CA-Si Organic-inorganic Hybrid Polymer Membranes A catalytic amount of acetic acid 0.01 g, 0.17 mmol) was added to 18.38 g of a polymer solution in 1,4-dioxane or THF containing 0.708 g (2.13 mmol) of crosslinkable CA-organotriethoxysilane prepared in Example 1 and 0.212 g (0.085 mmol) of PPO-PEO-PPO-organotriethoxysilane polymer prepared in Example 3 followed by the addition of 0.01 g, 0.17 mmol) of ethanol. The resulting solution was mixed for at least 6 hours at room temperature. The solution was then filtered through a 0.2 μm PTFE membrane filter. 16.0 g of the filtrate solution containing about 0.8 g of total polymers was cast onto the surface of a clean glass plate, and dried at room temperature for 24 hours. The resulting crosslinked PPO-PEO-PPO-CA-Si hybrid polymer membrane was detached from the glass plate and further dried at 110° C. for at least 48 hours in vacuo.

The invention claimed is:

1. A crosslinked organic-inorganic hybrid polymer membrane comprising a crosslinked organic-inorganic hybrid polymer made from at least two different precursor organic polymers having hydroxyl, amino, epoxy, isocyanato, or dianhydride groups wherein each precursor organic polymer is selected from the group consisting of poly(ethylene oxide) (PEO), cellulose acetate (CA), poly(propylene oxide) (PPO), co-block-poly(ethylene oxide)-poly(propylene oxide) (PEO-PPO), tri-block-poly(propylene oxide)-poly(ethylene oxide)-poly(propylene oxide) (PPO-PEO-PPO), poly(propylene glycol)-block-poly(ethylene glycol)-block-poly(propylene glycol) bis(2-aminepropyl ether) (PAPE), dendritic PEO, and hyperbranched amine-terminated PEO, and crosslinked with an organosilicon alkoxide crosslinking agent.

2. The crosslinked organic-inorganic hybrid polymer membrane of claim 1 wherein one of said precursor polymers is cellulose acetate.

3. The crosslinked organic-inorganic hybrid polymer membrane of claim 1 wherein one of said precursor polymers is cellulose acetate and at least one of said precursor polymers is selected from the group consisting of poly(ethylene oxide)s (PEO), poly(propylene oxide) (PPO), co-block-poly(ethylene oxide)-poly(propylene oxide) (PEO-PPO), tri-block-poly(propylene oxide)-poly(ethylene oxide)-poly(propylene oxide) (PPO-PEO-PPO), poly(propylene glycol)-block-poly(ethylene glycol)-block-poly(propylene glycol) bis(2-aminepropyl ether) (PAPE), dendritic PEO, and hyperbranched amine-terminated PEO.

4. The crosslinked organic-inorganic hybrid polymer membrane of claim 1 wherein one of said precursor polymers is cellulose acetate and at least two of said precursor polymers are selected from the group consisting of poly(ethylene oxide) (PEO), poly(propylene oxide) (PPO), co-block-poly(ethylene oxide)-poly(propylene oxide)s (PEO-PPO), tri-block-poly(propylene oxide)-poly(ethylene oxide)-poly(propylene oxide) (PPO-PEO-PPO), poly(propylene glycol)-block-poly(ethylene glycol)-block-poly(propylene glycol) bis(2-aminepropyl ether) (PAPE), dendritic PEO, and hyperbranched amine-terminated PEO.

5. The crosslinked organic-inorganic hybrid polymer membrane of claim 1 wherein one of said precursor polymers is cellulose acetate and one of said precursor polymers is poly(ethylene oxide).

* * * * *